(12) United States Patent
Devroye et al.

(10) Patent No.: US 7,778,598 B2
(45) Date of Patent: Aug. 17, 2010

(54) ASYMMETRIC COOPERATION IN DOWNLINK CELLULAR NETWORKS WITH RELAY STATIONS

(75) Inventors: Natasha Devroye, Cambridge, MA (US); Neelesh B. Mehta, Needham, MA (US); Andreas F. Molisch, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 878 days.

(21) Appl. No.: 11/625,565

(22) Filed: Jan. 22, 2007

(65) Prior Publication Data

US 2008/0175183 A1    Jul. 24, 2008

(51) Int. Cl.
H04B 7/185    (2006.01)
H04B 7/14    (2006.01)
H04B 3/36    (2006.01)

(52) U.S. Cl. .................... 455/13.4; 455/13.1; 370/279; 370/293; 370/315

(58) Field of Classification Search ............... 455/13.1, 455/13.4, 16–18, 20–23; 370/279, 293, 315, 370/492, 501
See application file for complete search history.

(56) References Cited

U.S. PATENT DOCUMENTS

| 2001/0036810 | A1* | 11/2001 | Larsen | 455/11.1 |
| 2007/0036071 | A1* | 2/2007 | Herdin | 370/210 |
| 2007/0160014 | A1* | 7/2007 | Larsson | 370/338 |
| 2008/0159425 | A1* | 7/2008 | Khojastepour et al. | 375/260 |

* cited by examiner

*Primary Examiner*—Un C Cho
(74) *Attorney, Agent, or Firm*—Dirk Brinkman; Gene Vinokur

(57) ABSTRACT

In a wireless network using cooperative relaying, a set of messages are broadcast from a base station to a set of relay stations during a first phase of a scheduling interval. During a second phase of the scheduling interval, the set of messages from the set of relay stations are broadcasting cooperatively to a set of mobile stations, while broadcasting. While broadcasting, a time and a rate and a size of each message is optimized during the first phase, and a rate of each message is optimized during the second phase.

12 Claims, 6 Drawing Sheets

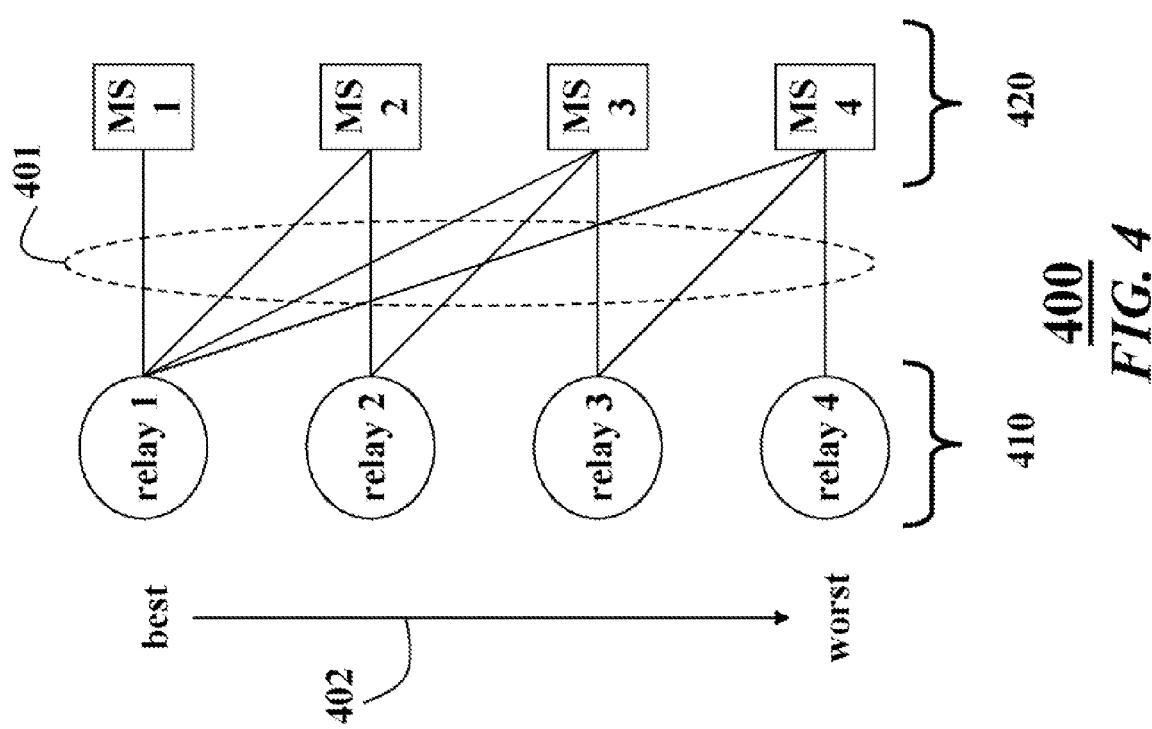

ASYMMETRIC COOPERATION IN DOWNLINK CELLULAR NETWORKS WITH RELAY STATIONS

FIELD OF THE INVENTION

This invention relates generally to wireless networks, and more particularly to cooperation in downlinks of cellular networks with relay stations.

BACKGROUND OF THE INVENTION

In conventional relay networks, messages are transmitted from a source node to a destination node via a single path with, perhaps, multiple serial hops through relay nodes. In a cooperative relay networks, wireless nodes cooperate with each other in transmitting messages in parallel. By exploiting the broadcast nature of a wireless channel to reach multiple relay nodes concurrently, and by enabling the relay nodes to cooperate, it is possible to reduce power consumption in delivering a message from the source to the destination. This can also significantly increase gains in overall throughput and power efficiency, A. Nosratinia, T. Hunter, and A. Hedayat, "Cooperative communication in wireless networks," IEEE Communications Magazine, vol. 42, pp. 68-73, 2004, Sendonaris, E. Erkip, and B. Aazhang, "User cooperation diversity—Part I: System description," IEEE Transactions on Communications, vol. 51, pp. 1927-1938, 2003, A. Jardine, S. McLaughlin, and J. Thompson, "Comparison of space-time cooperative diversity relaying techniques," in Proc. IEEE VTC 2005—Spring, pp. 2374-2378, 2005, and J. N. Laneman, D. N. C. Tse, A. Stefanov and E. Erkip, "Cooperative coding for wireless networks," IEEE Trans. Commun., pp. 1470-1476, September 2004, and G. W. Wornell, "Cooperative diversity in wireless networks: Efficient protocols and outage behavior," IEEE Transactions on Information Theory, vol. 50, pp. 3062-3080, 2004, all incorporated herein by reference.

In cooperative networks, messages are transmitted to the destination node in parallel using several intermediate relay nodes, A. Wittneben, I. Hammerstroem, and M. Kuhn, "Joint cooperative diversity and scheduling in low mobility wireless networks," IEEE Global Telecommunications Conference (GLOBECOM), vol. 2, pp. 780-784, 2004, A. E. Khandani, J. Abounadi, E. Modiano, and L. Zheng, "Cooperative routing in wireless networks," Allerton Conference on Communications, Control and Computing, 2003, and Rankov and A. Wittneben, "Distributed spatial multiplexing in a wireless network," The Asilomar Conference on Signals, Systems, and Computers, pp. 1932-1937, 2004, all incorporated herein by reference.

Some simple relay selection criteria are described by J. Luo, R. S. Blum, L. J. Cimini, L. J. Greenstein, and A. M. Haimovich, "Link-Failure Probabilities for Practical Cooperative Relay Networks," IEEE Globecom 2005, incorporated herein by reference. Two of the criteria, 'Pre-Select One Relay' and 'Best-Select Relay' select a single best relay based on a mean channel gains, while in the remaining two criteria, 'Simple Relay' and 'ST-Coded Relay', all the relay stations that decode data from source are selected. In 'Simple Relay', the relay nodes do not synchronize their phase, while in ST-Coded Relay, a distributed space-time code is used.

Search algorithms for selecting a single relay node based on an average distance or path loss between the nodes, based on the frame error probability and pairwise code word error probability are described by Zinan Lin and Elza Erkip "Relay Search Algorithms for Coded Cooperative Systems," IEEE Globecom 20005, incorporated herein by reference.

Khandani et al. describe a model that is restricted to additive white Gaussian noise (AWGN) channels with phase compensation. That model does not consider dynamic fading-induced channel variations, outage, or the overhead required for cooperation between relay nodes.

Knowledge of the channel state information (CSI) at a transmitter is assumed by Laneman, Rankov, and Larson above. However, they do not consider the cost of acquiring the CSI. Wittneben only considers amplify-and-forward, which also neglects the cost of acquiring the CSI, see also Abdallah and H. C. Papadopoulos, "Beamforming algorithms for decode-and-forward relaying in wireless networks," Conference on Information Sciences and Systems, 2005.

If the relay nodes do not have the CSI, then the receiver can, at best, accumulate the mutual information from the various relay nodes, e.g., through space-time coding, see Luo et al. and Jardine et. al. Outage analysis of such relay schemes, when the links operate at a given signal-to-noise ratio, are described by Y. Zhao. R. Adve, and T. J. Lim, "Outage probability at arbitrary SNR with cooperative diversity," IEEE Communications Letters, pp. 700-702, 2005, and A. Khisti, U. Erez, and G. Wornell, "Fundamental limits and scaling behavior of cooperative multicasting in wireless networks," IEEE Trans. Information Theory, Vol. 52, No. 6, June 2006, incorporated herein by reference.

Cooperative communications in wireless networks can be achieved using a number of well known physical layer communication techniques. When the channel fading is unknown at the transmitter, space-time coding can improve the reliability of the links. Distributed space-time coding is another way of achieving diversity in cooperative communications over fading channels. When the channel coefficients are known to the transmitters, distributed beamforming, or distributed space division multiple access techniques can be used to achieve cooperative gains. In channels involving relay stations, decode-and-forward, amplify-and-forward, and bursty-amplify-and-forward schemes are the prevalent communication techniques and protocols.

Of particular interest is cooperative communication for the downlink of a cellular network, where during each scheduling interval, multiple messages are transmitted from a base station to mobile stations, e.g., cellular telephones. Scheduling in wireless networks is described generally by Andrews, "A survey of scheduling theory in wireless data networks," in Proc. of the 2005 IMA summer workshop on wireless communications, June 2005, and Liu et al., "A framework for opportunistic scheduling in wireless networks," Compute Networks, vol., 41, no. 4, pp. 451-474, 2003, all incorporated herein by reference.

There are two main categories of relay stations in the cellular setting: fixed relay stations and mobile relay stations. The benefits of employing fixed relay stations include extending cell coverage, boosting transmission rates, improving spectral efficiency, and costs relative to constructing complete base stations, Hu et al., "Range extension without capacity penalty in cellular networks with digital fixed relay stations," in IEEE Global Telecommunications Conference (Globecom), November 2004, and Pabst et al., "Relay-based deployment concepts for wireless and mobile broadband radio," IEEE Communication Mag., vol, 42, no. 9, pp. 80-89, September 2005, all incorporated herein by reference. Mobile relay stations are more likely to occur in ad hoc networks, all incorporated herein by reference.

Another cooperative strategy uses a MIMO fixed relay with linear processing to support multi-user transmission in cellular networks. Chae et al., "MIMO relaying with linear processing for multi-user transmission in fixed relay networks," IEEE Trans. Signal Processing, vol. 9, no. 1, pp. 19-31, 2006, incorporated herein by reference. The single fixed relay processes the received signal with linear operations and forwards the processed signal to multiple mobile stations. They describe a two-phase protocol. Phase 1 uses a MIMO channel between a multi-antenna base station and a MIMO relay station, while during phase 2, the MIMO relay station pre-codes and transmits the messages to multiple mobile stations.

Challa et. al., "Cost-aware downlink scheduling of shared channels for cellular networks with relay stations," in IEEE IPCCC, April, 2004, incorporated herein by reference, describe two hop downlink scheduling in cellular networks with relay stations. There, the scheduling algorithm tries to improve the shared channel utilization by selecting either a one hop path from base station to mobile, or a two hop path from the base station to the relay and then from the relay to mobile that yields the best channel throughput while using low transmission power for the shared channel in a CDMA based cellular system. However, cooperation between relay stations is not permitted.

Viswanathan et al., "Performance of cellular networks with relay stations and centralized scheduling," IEEE Trans. Wireless Commun., vol. 4, no. 5, pp. 2318-2323, September 2005, incorporated herein by reference, describe a centralized downlink scheduling scheme in a cellular network with a small number of relay stations. They obtain throughput results for various scenarios and study the effect of number of relay stations, relay transmit power relative to the base station power, and the effect of distributing a given total power between the base station and different numbers of relay stations. There is no cooperation between relay nodes.

Cooperative transmission has also been considered from an information theoretic perspective under the name of cognitive radio channels, or interference channels with degraded message sets, see Devroye et al., "Achievable rates in cognitive radio channels," IEEE Trans, Inf. Theory, vol. 52, no. 5, pp. 1833-1827, May 2006, and Jovicic et al., "Cognitive radio: An information-theoretic perspective," IEEE Trans. Inf. Theory, May 2006, both incorporated herein by reference.

SUMMARY OF THE INVENTION

The embodiments of the invention provide cooperative communication in the downlinks of a cellular network with a base station, a set of relay stations and a set of mobile stations. Each scheduling interval has two phases. The scheduling intervals can have variable lengths.

During the first phase, the base station transmits messages to the set of relay stations using time division multiple access (TDMA). One message is transmitted in each TDMA time interval which may be of varying length. It is noted, that the embodiments of the invention can be extended to use forms of phase 1 transmission such as, for example, broadcasting SOMA, CDMA, OFDM, or FDMA. During the second phase, the set of relay stations cooperate to transmit received messages to the set of mobile stations concurrently using space division multiple access (SDMA). The second phase can also be extended to allow for other transmission schemes, such as for example TDMA, FDMA, CDMA, or OFDM.

In our invention, we do not require that all messages have to be transmitted to all relay stations. Rather, some relay stations may only receive a subset of the messages, because the time assigned to some messages in phase 1 might not be sufficient to transmit the messages to all relay stations. As a consequence, the transmission strategies in phase 2, i.e., which relay transmits which message with what pre-coding, depend on which relays stations received which messages, The embodiments of the invention optimize jointly the transmission parameters for both phases. Two optimization criteria are described, as well as two forms of cooperation in the second phase: dirty-paper coding, and linear pre-coding.

BRIEF DESCRIPTION OF THE DRAWINGS

FIG. 4 is a block diagram of a message knowledge structure according to an embodiment of the invention;

DETAILED DESCRIPTION OF THE PREFERRED EMBODIMENTS

Figure 1:
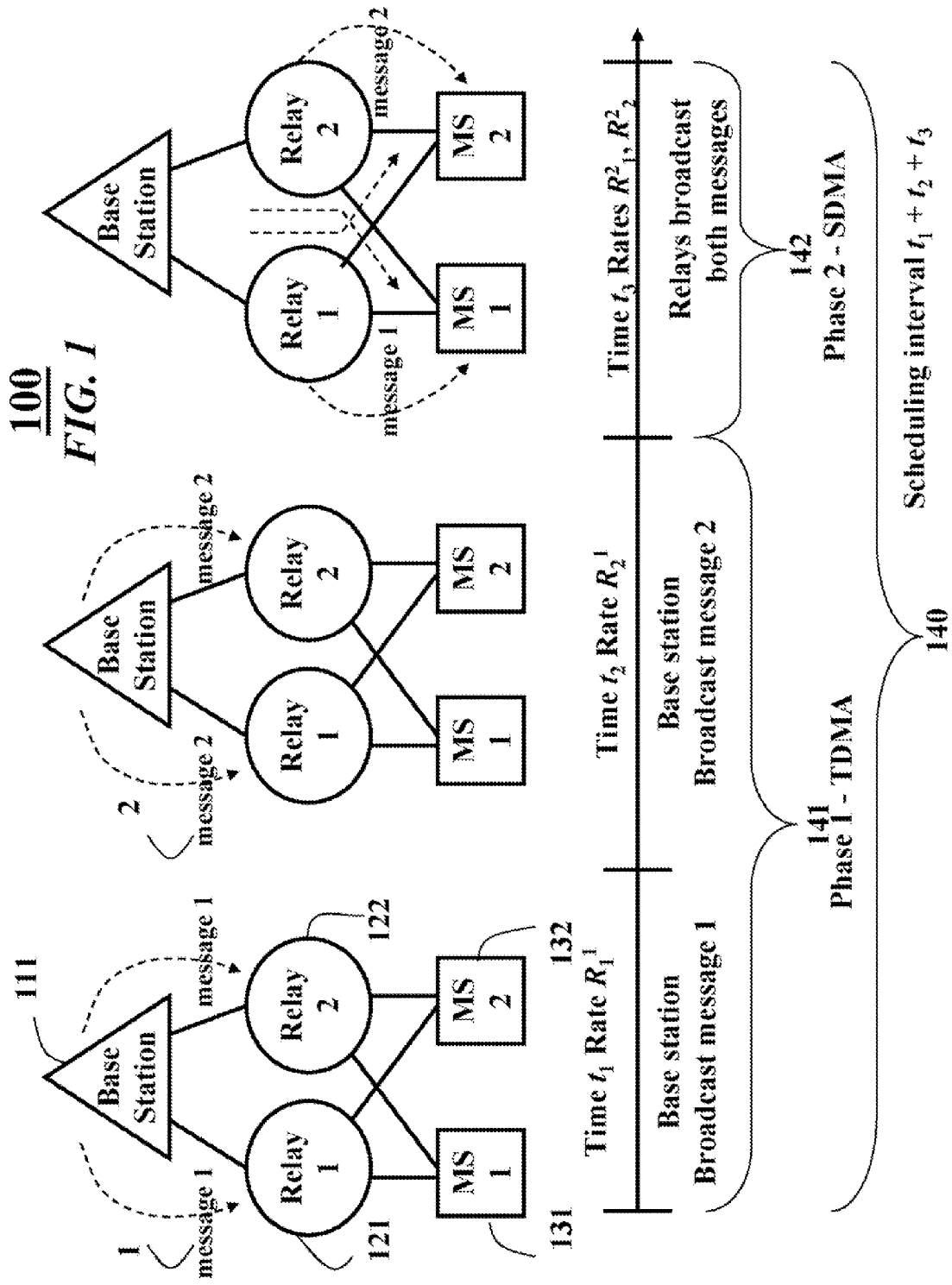
FIG. 1 is a block diagram of a cooperative relay network for transmitting messages in two phases according to an embodiment of the invention.

FIG. 1 shows a wireless relay network 100 according to an embodiment of our invention. In an example application, a set of messages are communicated in a downlink of a cellular network. The network 100 includes a base station 111, a set of relay stations 121-121, and a set of mobile stations (MS) 131-132. It should be noted that the invention can be extended to the case of R relay stations and M mobile stations. However, in order to detail the essence of the invention in a simple manner, we described, the one base station, two relay station and two mobile station case in detail.

The base station 111 broadcasts a set of messages 1-2 to the two mobile stations 131-131 using the cooperation of the two relay stations during a scheduling interval 140. It is desired transmit the messages in a best manner, where best depends on some optimization criterion, e.g., total throughput to both, mobile stations, or maximal or minimal throughput to either mobile station under a minimal power or minimal delay constraints.

The embodiments of the invention use two phase 141-142 to transmit the set of messages to the mobile stations during the scheduling interval 140. During the first phase 141, the base station 111 broadcasts the set of messages to one or more of the relay stations 121-122 using, e.g., time division multiple access (TDMA).

The first phase could alternately involve broadcasting the message in a dirty-paper coding fashion, and employing FDMA, OFDM, or CDMA schemes. Additionally, the mobile stations could try to decode its message from the base-station's transmission. In the event a mobile station is able to decode the message, due to favorable channel conditions for example, phase 2 would become unnecessary, and a new scheduling interval could commence. If it does not succeed in decoding the message fully, each mobile could nonetheless retain the received signal in phase 1 to be combined with the phase 2 received signal, possibly boosting rates, or reducing time, and power.

The base station selects the transmission times (t), rates (R) and sizes (n) for each of the individual and independent messages. During phase 2, the relay stations cooperate to transmit received messages to the mobile stations 131-132 using, e.g., space division multiple access (SDMA) techniques.

Alternatively, the relays could use a combined beamforming-TDMA approach to transmit messages in phase 2. That is, each message could be assigned a time $t^{(2)}_1$ and $t^{(2)}_2$, respectively, during which the relays cooperate to beamform the message to the desired receiver. Phase 2 could also employ CDMA, FDMA, OFDM, or space-time-coding techniques to transmit the two messages to the mobile stations. It is also possible that some relays start phase 2 by a "receiving phase", i.e., receiving transmission of certain messages intended for other relay stations. This can be an efficient strategy if the transmission channel between two relay stations has a low attenuation, and the knowledge of a message by an additional relay station leads to more efficient transmission during phase 2.

We use an asymmetric message knowledge structure 400, see FIG. 4. Because of the TDMA structure of phase 1, as will as the broadcast advantage of wireless channels, it is possible for different relay stations to receive different subsets of the messages. Here, a subset can be none, some, or all of the messages broadcast fay the base station. Which relay station has which messages is denoted as the message knowledge structure 400.

Our relay stations cooperate in a novel way. Relay stations cooperating as a distributed antenna array have been described for space-time block codes. However, the asymmetric cooperation according to the embodiments of our invention, which arise from the asymmetric message knowledge structure, is novel. This determines how the cooperation among the relay stations is to be achieved.

Specifically, the asymmetric cooperation restricts the linear preceding matrices when linear pre-coding (LPC) is used, or the transmit covariance matrices when dirty-paper coding (DPC) is used—to be of certain forms with zeros at appropriate matrix elements, as indicated by the message knowledge structure 400.

Relay stations can communicate with each other. The embodiments described herein can be generalized to enable relay stations to communicate between each other before, or during phase 2. For example, relay stations can exchange messages. Alternatively, relay stations with particularly 'bad' channels to the base station but 'good' channels to the mobile stations can be given the messages by the other relay stations that have good channels to the base station but bad channels to the mobile stations. Thus, the message can take multiple hops to reach the final destination, e.g., three hops from the base station to one relay station, and then to another relay station, and finally to the mobile station.

Although we describe the case where phase 1 uses TDMA and phase 2 uses SDMA, other schemes can also be used. If the relay stations uses TDMA, then message do not interfere with one another during the second phase.

We optimize both phases jointly, rather than, optimizing each phase independent of the other phase. We are not interested in comparing the merits of various optimization criterion, but rather, we determine how communication should take place under a given optimization criterion. Specifically, we are interested in determining the benefits and pitfalls of having the nodes cooperate in order to transmit the set of messages.

Let us now introduce precise mathematical notation for the (simplified) scenario we consider henceforth. We assume communication takes place in two phases 141-142. During the first phase 141, the base station 111 is the only transmitter, and in a time-division multiple access (TDMA) structure, broadcasts one message at a time to the relay stations, For a certain period of time $t_1$, the base station transmits message 1 of size $n_1$ at a rate $R^{(1)}_1$. After this time, the base station transmits message 2 of size $n_2$ for a time $t_2$, at another rate $R^{(1)}_2$, which can be the same, or different than the rate $R^{(1)}_1$.

This TDMA structure is both simple, as well as optimal in a single antenna case. Specifically, when the base station has a single transmit antenna, as we assume for the purpose of this description, it is optimal in terms of throughput. This TDMA structure also results in efficient use of the broadcast advantage because any relay stations may receive the messages.

Therefore, the base station selects the times $t_1$, $t_2$, as well as the rates $R^{(1)}_1$, $R^{(1)}_2$ so that the desired relay stations obtain the appropriate messages. This means that asymmetric message knowledge at the relay stations is possible. In many cases, this is beneficial. Such asymmetric message knowledge is essentially a consequence of the broadcast advantage.

In the second phase 142, the relay stations concurrently transmit received messages to the mobile stations in, e.g., a modified space division multiple access (SDMA) manner. Phase 2 employs modified SDMA because conventionally, SDMA refers to a system in which multiple different messages are concurrently transmitted to various mobile stations when the transmitter knows all the messages in their entirety a priori.

In our case, the relay stations form, a distributed antenna array which, cooperates in an ideal synchronized fashion, but where each relay stations may only receive a subset of the messages to be transmitted to the mobile stations, rather than all of the messages. Note that for the purpose of this description, we assume here that the relay stations have only one antenna each, but the invention is also applicable to relay stations with multiple antennas.

Phase 2 is of duration $t_3$. During this time, both messages are sent to the mobile stations. We assume that the relay stations do not buffer messages. Any messages that are received during phase 1 are fully transmit (or discarded) during phase 2. During phase 2, we assume transmission uses either a modified (according to the asymmetric message knowledge constraints) linear pre-coding (LPC) scheme, or else, a modified dirty-paper coding (DPC) scheme, which are described in detail below.

The conventional cooperative transmission is thus extended by embodiments of our invention to encompass asymmetric cooperation cases. It is also used to mean that the base station selects its phase 1 transmission variables with phase 2 in mind. The two phases are linked in our cooperative scheme. This is in sharp contrast to the conventional two-hop scenario in which a message is simply transmit to one of the relay stations, which then passes the message to the mobile station. In that scenario, no cooperation between the relay stations is needed.

We describe the benefits of joint base and relay station cooperation over multi-hop scenarios. We stress again that the restrictions on the transmission scheme and the number of relay/mobile stations are solely for the purpose of this description, and do not limit the general, applicability of our invention.

Figure 2:
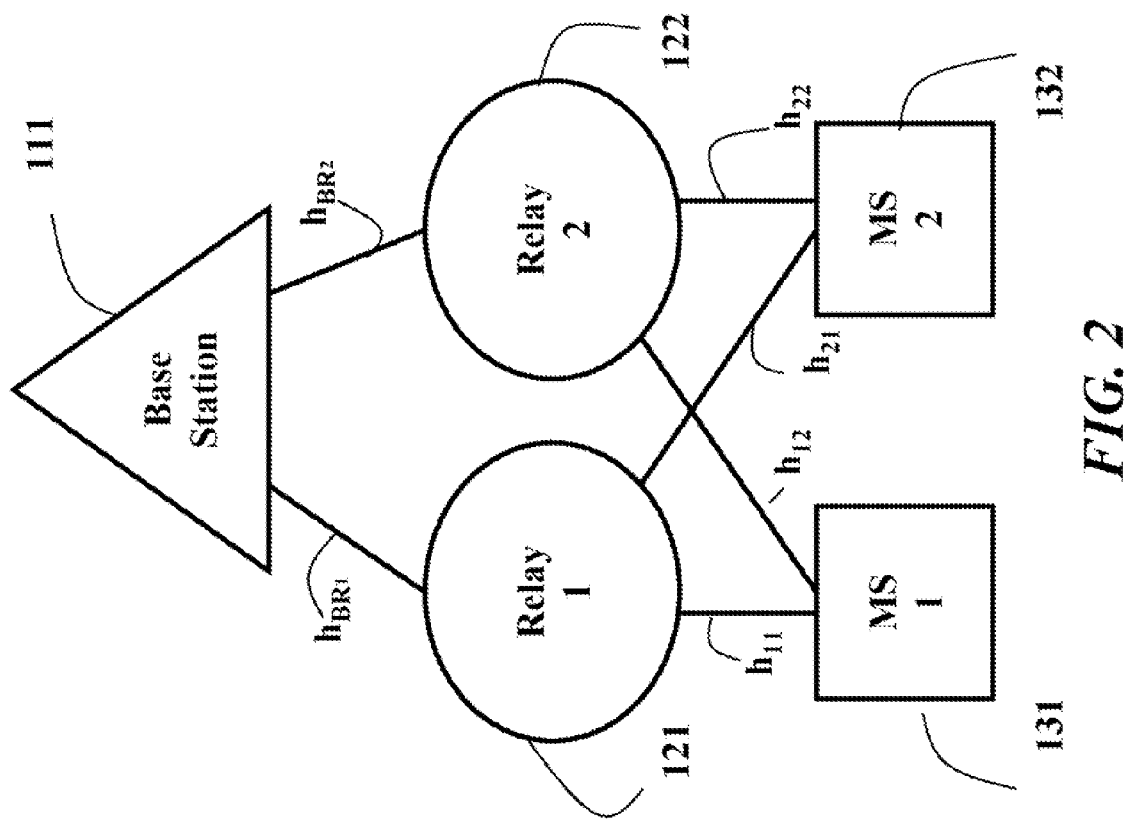
FIG. 2 is a block diagram of the network of FIG. 1 showing channel, gains.

We define some of the variables and parameters used herein. As shown in FIG. 2, the channel gains between the base station and relay 1 or relay 2 are $h_{BR1}$ and $h_{BR2}$, respectively. We assume, without of loss of generality, that $|h_{BR1}| \geq |h_{BR2}|$. As a consequence, because of the broadcast advantage, whenever relay 2 receives a message, relay 1 also receives the message. The channel gains between relay 1 and mobile 1 (MS 1) or mobile 2 (MS 2) are denoted by $h_{11}$ and $h_{12}$, respectively, where subscripts are in the form (transmitter-receiver)). Similarly, $h_{21}$ and $h_{22}$ are the channel gains between relay 2 and MS 1, MS 2, respectively. We assume all channel gains are known to all nodes. Thus, the optimization can be performed jointly. We also assume an additive white Gaussian noise channel (AWGN) with independent zero mean, unit variance noise at the mobile stations and relay stations.

The time for broadcasting the message 1 and message 2 during phase 1 are denoted by $t_1$ and $t_2$, respectively. The time for phase 2 is denoted by $t_3$, The rate at which message 1 is broadcast during phase 1 is $R^{(1)}_1$, while that at which message 2 is broadcast is denoted by $R^{(1)}_2$. We allow for messages of variable number of bits, e.g., message 1 has a size of $n_1$ bits, while message 2 has a size of $n_2$ bits, generally message i has a size of $n_1$ bits. The base station 110 also determines the message sizes $n_1$ and $n_2$ so as to optimize a utility function, namely; an extreme fairness criterion, and a maximal throughput criterion, described below in detail Our network operates under average power constraints. Tire base station transmits Gaussian messages. This is optimal for an AWGN channel with maximal expected power $P_B$, while the relay stations have a sum-power constraint of $P_R$. The relay stations can distribute this power in any way. Note that the base stations transmit using Gaussian codebooks in order to determine the fundamental limits of communication possible under the considered scenarios. We note that this is by no means necessary in practice; other codebooks may just as well be employed.

Figure 3:
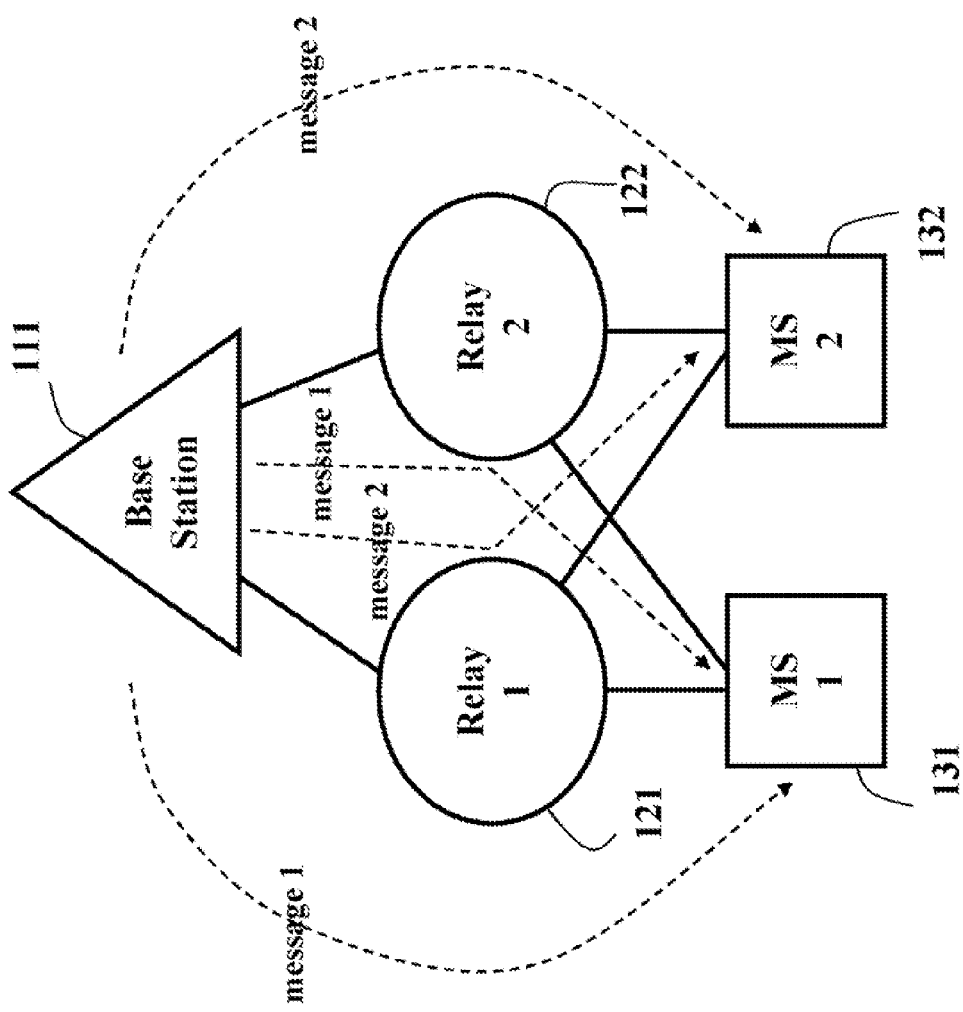
FIG. 3 is block diagram of possible message paths from a base station to mobile stations via relay stations.
Figure 5A:
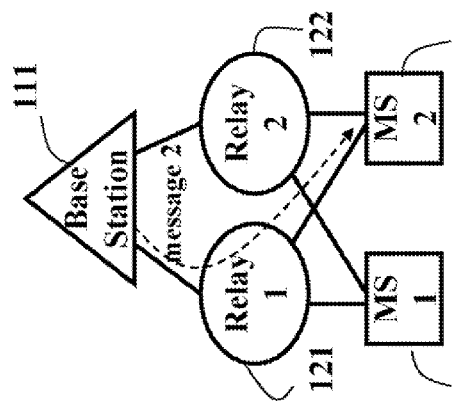
FIGS. 5A-5D are block diagrams of four message paths for a single message.
Figure 5B:
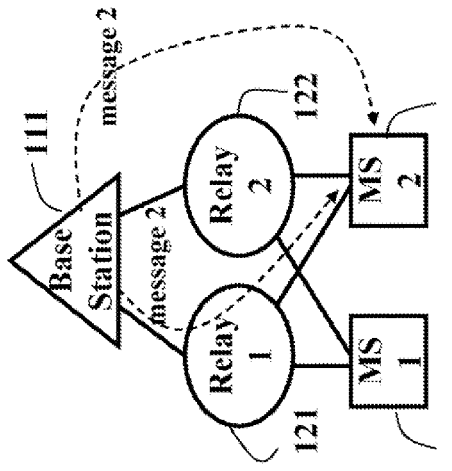
Figure 5C:
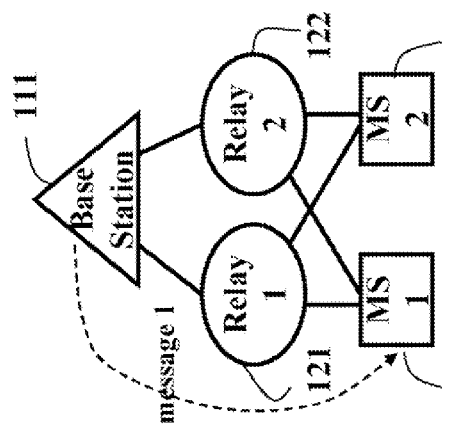
Figure 5D:
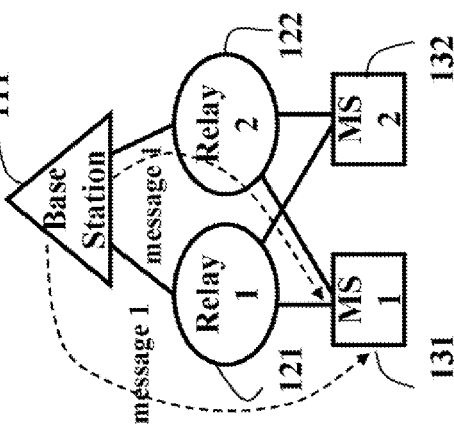

We now describe the two phases in greater detail. As shown in FIG. 3, two messages are to be transmitted: message 1 from the base station to MS 1, and message 2 from the base station to MS 2. Each message is transmitted during two phases, where during phase 1, the messages are broadcast from the base station to the relay stations, and during phase 2 from the relay stations to the mobile stations. Thus, there are four possible message paths the two messages may take.

Phase 1: Pyramid-Like Message Knowledge Structure

During phase 1, messages are broadcast, in a TDMA manner, from the base station to the set of relay stations. If there are M mobile stations (and consequently, M messages), then phase 1 is defined by M time variables $t_1, \ldots, t_M$. The base station transmits the message $M_j$ (ultimately destined to mobile j) for a duration of time $t_j$. The rate R of transmission is the Shannon rate of the 'worst' relay station to receive the message.

Having variability in both time and rate enables messages of various sizes to be transmitted. Thus, there are thus two rates $R^{(1)}_1$ and $R^{(1)}_2$, and two times $t_1$, $t_2$, which the base station determines optimally in order to schedule messages to be broadcast during phase 1.

The rate at which the base station, at power $P_B$, can reliably transmit to relay 1, or relay 2 are given respectively by the Shannon rates:

$$R_{BR_1} = \frac{1}{2}\log_2(1 + |h_{BR_1}|^2 P_B) \quad (1)$$

$$R_{BR_2} = \frac{1}{2}\log_2(1 + |h_{BR_2}|^2 P_B). \quad (2)$$

The true variable to be obtained from phase 1 are indicators $I_{ij}$, which is 1 if relay i receives the message for mobile j, and 0 otherwise. From these indicators $I_{ij}$, i, j=1, 2, we can obtain $t_1$ and $t_2$ for the first phase as $$t_1 = \max\left(\frac{n_1 I_{11}}{1/2\log_2(1 + |h_{BR_1}|^2 P_B)}, \frac{n_1 I_{21}}{1/2\log_2(1 + |h_{BR_2}|^2 P_B)}\right) \quad (3)$$

$$t_2 = \max\left(\frac{n_2 I_{12}}{1/2\log_2(1 + |h_{BR_1}|^2 P_B)}, \frac{n_{22} I_{22}}{1/2\log_2(+|h_{BR_2}|^2 P_B)}\right). \quad (4)$$

The broadcast nature of the channel results in a pyramid-like message knowledge structure as shown in FIG. 4. That is, the relay station with the best channel gain, here assumed to be relay 1, receives all messages, assuming all $t_i$>0), and the relay station with the worst channel gain, and that is still to receive at least one message, receives a subset of messages, i.e., between zero and all messages. All relay stations with channel gains between these two extremes receive messages in a pyramid-like structure.

This pyramid-like message knowledge structure is a result of the broadcast nature of the channel. In our TDMA scheme for phase 1, the rate of a particular message is reduced so as to allow the relay station with the worst channel gain, which desires to decode the message, to be able to correctly decode the message. This means that all relay stations with better channel gains receive that particular message, whether the relay stations want the message or not. This results in a message knowledge structure as shown in FIG. 4, where the best to worst base-to-relay channels 401, from the relays 410 to the mobile 420, are arranged in a top-to-bottom order 402. The broadcast nature of the channel results in a pyramid-like message knowledge structure. The link. 401 indicates which relay stations receive which messages.

We note that regardless of the type of encoding used in the second phase, in this two relay, two mobile scenario, there are only a finite number of possible cases to consider. Each case corresponds to a different message knowledge structure, i.e., which relay stations receive which messages. The number of possibilities increases exponentially with the number of messages. Enumeration is possible for this two relay, two mobile case, but becomes more difficult as the number of relay stations and messages increases.

The number of relay stations is in essence the number of degrees of freedom in the channel. It is sum-rate optimal to transmit to as many mobile stations as there are antennas, or relay stations in this case. We assumed that the base-station to relay channel of relay 1 is better than relay 2, that is $|h_{BR1}| \geq |h_{BR2}|$. Then, whenever relay 2 receives a message, relay 1 receives the message as well.

We use the notation $$I = \begin{bmatrix} I_{11} & I_{12} \\ I_{21} & I_{22} \end{bmatrix}$$

to indicate which relay station receives message. Array element $I_{ij}$ indicates whether relay i has the message destined to mobile j. Then, the time spent broadcasting message 1 during phase 1 is $t^{(1)}_1$, and the time spent broadcasting message 2 during phase 1 is $t^{(1)}_2$. This depends on which relay stations receives which messages as follows.

One Message Cases:

1) $I = \begin{bmatrix} 1 & 0 \\ 0 & 0 \end{bmatrix}$; $\quad t^{(1)}_1 = \frac{1}{\log_2(1 + |h_{BR_1}|^2 P_B)}, \quad t^{(1)}_2 = 0$ -continued 2) $I = \begin{bmatrix} 0 & 1 \\ 0 & 0 \end{bmatrix}$: $t_1^{(1)} = G$, $t_2^{(1)} = \frac{1}{\log_2(1 + |h_{BR_1}|^2 P_B)}$ 3) $I = \begin{bmatrix} 1 & 0 \\ 1 & 0 \end{bmatrix}$: $t_1^{(1)} = \frac{1}{\log_2(1 + |h_{BR_2}|^2 P_B)}$, $t_2^{(1)} = 0$ 4) $I = \begin{bmatrix} 0 & 1 \\ 0 & 1 \end{bmatrix}$: $t_1^{(1)} = 0$, $t_2^{(1)} = \frac{1}{\log_2(1 + |h_{BR_2}|^2 P_B)}$ Two Message Cases:

1) $I = \begin{bmatrix} 1 & 0 \\ 0 & 0 \end{bmatrix}$: $t_1^{(1)} = \frac{1}{\log_2(1 + |h_{BR_1}|^2 P_B)}$, $t_2^{(1)} = \frac{1}{\log_2(1 + |h_{BR_1}|^2 P_B)}$ 2) $I = \begin{bmatrix} 0 & 1 \\ 0 & 0 \end{bmatrix}$: $t_1^{(1)} = \frac{1}{\log_2(1 + |h_{BR_2}|^2 P_B)}$, $t_2^{(1)} = \frac{1}{\log_2(1 + |h_{BR_1}|^2 P_B)}$ 3) $I = \begin{bmatrix} 1 & 0 \\ 1 & 0 \end{bmatrix}$: $t_1^{(1)} = \frac{1}{\log_2(1 + |h_{BR_1}|^2 P_B)}$, $t_2^{(1)} = \frac{1}{\log_2(1 + |h_{BR_2}|^2 P_B)}$ 4) $I = \begin{bmatrix} 0 & 1 \\ 0 & 1 \end{bmatrix}$: $t_1^{(1)} = \frac{1}{\log_2(1 + |h_{BR_2}|^2 P_B)}$, $t_2^{(1)} = \frac{1}{\log_2(1 + |h_{BR_2}|^2 P_B)}$ These times are useful for determining the overall throughputs as described below. Essentially; these times and the message knowledge structures they induce link phase 1. and phase 2, making the joint optimization over both phases possible.

FIG. 5 shows the four cases for single message transmission paths. FIG. 5A shows message 1 through relay 1. FIG. 5B shows message 2 through relay 1. FIG. 5C shows message 1 through both relay stations. FIG. 5D shows message 2 through both relay stations. Which scheme is the best depends on the criterion to be optimized as well as the channel gains.

In general, it may be optimal, depending on the optimization criterion, to transmit only a single message to a single mobile. In FIG. 5A-5D we show the possible paths when message 1 is transmitted to MS 1, relay 1, relay 2, or both relay stations may be used in the modified SDMA of phase 2. In order for a relay station to cooperate in the transmission of message, the message must have successfully received, the message in phase 1. Thus, the transmission time $t_1$ and rate $R^{(1)}_1$ for message 1 is such that that relay station is able to correctly decode all $n_1$ bits of the message. We use a decode and forward strategy, in relay channel terms.

When two messages are transmit during phase 2, there are four possible message paths, as shown in FIGS. 6A-6D. Note, because we assumed that $|h_{BR1}| \geq |h_{BR2}|$, any message relay 2 receives, relay 1 also receives. Which one of these scenarios is selected depends on the optimization criterion and the channel gains. These four cases may be assumed, without loss of generality, by labeling relay 1 as the relay with the best base station-to-relay channel gain. Whenever relay 2 receives a message, because relay 1 has a better channel gain, relay 1 receives this message as well.

Figure 6A:
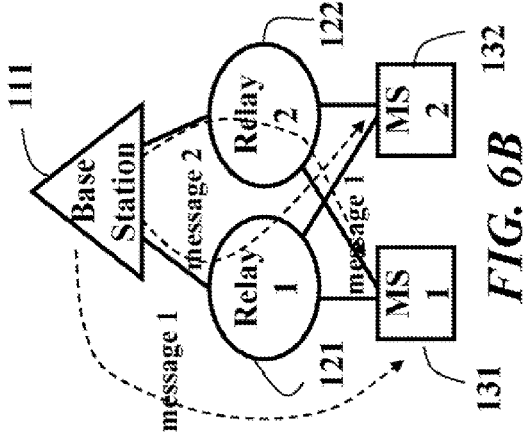
FIGS. 6A-6D are block diagrams of four message paths for a two messages.
Figure 6B:
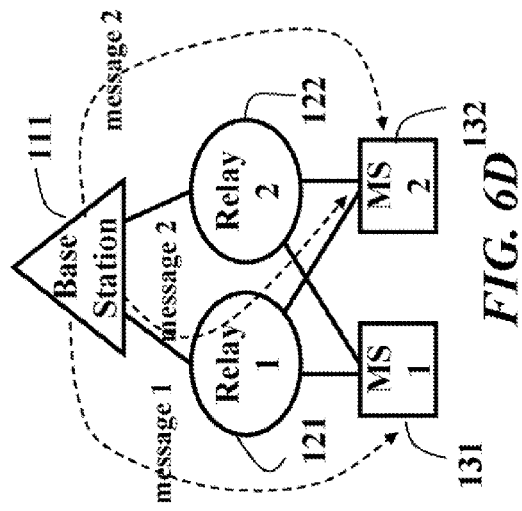
Figure 6C:
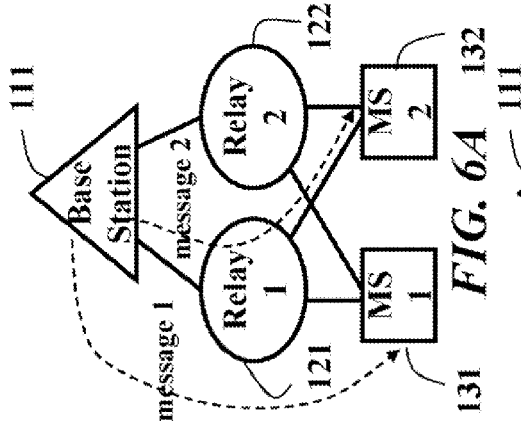
Figure 6D:
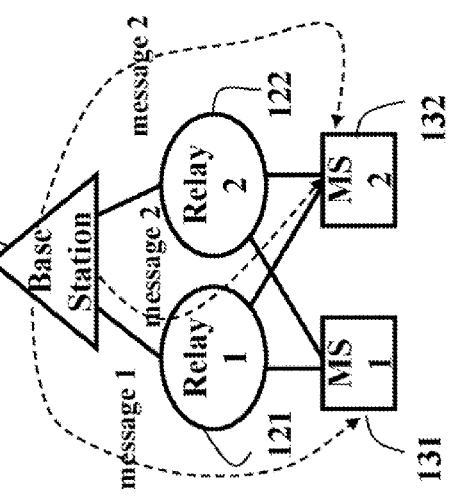

We call cases 1 and 4 in FIGS. 6A and 6D symmetric. During phase 2, where the relay stations transmit to the mobile stations, both messages are received by the same nodes by relay 1 in case 1 (6A), and by both relay stations in case 4 (6D). On the other hand, cases 2 and 3 (6B-6C) are called asymmetric during phase 2, That is, relay 1 receives both, messages, while relay 2 only receives message 1 in case 2, and message 2 in case 3.

Phase 1: Asymmetric Cooperation

During phase 2, the two relay stations encode whichever messages they have received and then transmit their messages concurrently over the channel to the mobile stations. Transmission continues until both MS 1 and MS 2 have received their messages. Then, we transition to a new scheduling interval. Once again, the base station optimally determines the $t_1$, $t_2$, the sizes $n_1$, $n_2$, as well as the rates $R^{(1)}_1$ and $R^{(1)}_2$ for the next scheduling interval. Thus, phase 2 is a modified form of SDMA, where the modification is due to the asymmetric message knowledge structure which can occur during phase 1.

We assume the relay stations encode the messages in one of two well-known techniques. These techniques are often used in evaluating the fundamental limits of communication over certain channels. However, in practice, other sub-optimal encoding strategies may be used. The first is linear pre-coding (LPC). Each relay transmits a linear combination of their messages. The second is dirty-paper coding (DPC), see generally Caire et al, "On the achievable throughput of a multi-antenna gaussian broadcast channel" IEEE Trans. Inf. Theory, vol. 49, no. 7, pp. 1691-1705, July 2003, and Costa et al, "Writing on dirty paper," IEEE Trans. Inf. Theory, vol IT-29, pp. 439-441, May 1983, both incorporated herein, by reference. There, messages are successively encoded using an interference-mitigating technique of dirty-paper coding which Is known to achieve the capacity region of the Gaussian multiple input multiple output (MIMO) broadcast channel, see Weingarten et al., "The capacity region of the Gaussian MIMO broadcast channel," Proc. 2004 Conference on Information Sciences and Systems (CISS), March 2004, incorporated herein by reference.

We describe both of these encoding techniques, and the subtleties involved in their application to our embodiments of cooperative communications. In following, we assume the mobile stations decode the messages independently. Thus, cooperation is only possible between the relays and not the mobiles.

All undesired signals are treated as noise. Thus, no interference cancellation or successive decoding is employed. These ideas could also be extended to allow for successive decoding as well as the combining of received messages during phases 1 and 2. We denote the transmitted signal at the two relay stations by $X_1$ and $X_2$, respectively, or in column vector form $X=[X_1, X_2]'$. Similarly, the received signals at the two mobile stations are given by $Y_1$ and $Y_2$, respectively, or $Y=[Y_1, Y_2]'$ in the column vector form. These are related to the inputs at the relay stations through $$Y = HX + N,$$

where $$H = \begin{bmatrix} h_{11} & h_{21} \\ h_{12} & h_{22} \end{bmatrix}$$

and $$N = \begin{bmatrix} N_1 \\ N_2 \end{bmatrix},$$

and X has independent, zero mean, unit variance AWGN components.

The most general formulation of our problem optimizes the utility function subject to the constraint during the two phases. The decision variables are, in general, the transmission times, rates, and size of each, message in phase 1, or equivalently, either the rates or times can be replaced by optimizing over the indicator variables in phase 1, It is important to note that the two phases are intertwined and connected through the message knowledge structure phase 1 induces on phase 2. In phase 2, the decision variables are the transmission parameters. These depend on which transmission strategy is used.

In order to make the problem more concrete, we assume two transmission strategies: linear pre-coding and dirty-paper coding as well as two utility functions: (1) an extreme fairness criterion, and (2) a maximal throughput criterion.

Utility Function: Extreme Fairness

The first utility function we will assume in order to explore the benefits and pitfalls of our two phase cooperation is a utility function which results in extreme fairness towards the two mobile stations. Under this criterion, the same number of bits are transmit to each MS, and we wish to determine the transmission parameters that achieve this in the minimal amount of time. Alternatively, we can transmit the same number of bits to both mobile stations using the minimal amount of power. These two problems are directly related, so we only consider minimizing the amount of time.

Thus, we assume $n_1 = n_2 = 1$, and seek to find $t_1$, $t_2$, $R^{(1)}_1$, $R^{(1)}_2$ in phase 1, and the appropriate transmission parameters in phase 2, which depend on the transmission strategy used, so as to minimize the overall time $t_1 + t_2 + t_3$. Of course, $t_3$ depends on the transmission parameters of phase 2 as well as $t_1$, $t_2$, $R^{(1)}_1$, and $R^{(1)}_2$.

Utility Function: Maximal Throughput

The extreme fairness criterion ensures that the same number of bits are transmit to each mobile during each scheduling interval. If the channels to one of the mobile stations are poor during that scheduling interval, then this can lead to a very inefficient use of power and/or time. A more efficient strategy can maximize the total sum-throughput to both mobile stations at each scheduling interval. Thus, our maximal throughput criterion seeks to select the phase 1 and phase 2 variables that maximize the sum-throughput, determined over the two phases, to both mobile stations. This of course comes at the expense of fairness. One mobile receive a small amount of data if the channel gains are continuously "worse" than the channels used by the other mobile station.

Other utility functions that remedy this unfairness, and provide tradeoffs between fairness and sum throughput can be considered. For simplicity, and to describe the two phase cooperation for the opposite extreme (maximal throughput may be considered to be extreme unfairness), we consider the maximal throughput criterion.

Different relay stations can have different messages. This affects the linear pre-coding as well as the dirty-paper coding. Such constrained optimizations are not described in the prior art. Even in the ideal case of having full matrices, it is difficult to find solutions.

Linear Pre-coding (LPC)

The first transmission strategy for phase 2 is linear pre-coding. Specifically, each relay station has received zero, one or two messages from the base station during phase 1. During phase 2, the relay stations transmit some linear combination of the received messages. If the messages are placed in a column vector $U = [U_1, U_2]'$ of normalized unit size, then the transmitted 2×1 column vector X is given by, $$\begin{bmatrix} X_1 \\ X_2 \end{bmatrix} = \begin{bmatrix} b_{11}I_{11} & b_{12}I_{21} \\ b_{21}I_{12} & b_{22}I_{22} \end{bmatrix} \begin{bmatrix} U_1 \\ U_2 \end{bmatrix}$$

where B is the 2×2 linear pre-coding matrix. We recall that the matrix $I_{ij}$ indicates whether the message i is received by relay j. The sum power constraint on the relay stations forces the element of B to satisfy $$b_{11}^2 I_{11} + b_{12}^2 I_{21} + b_{21}^2 I_{12} + b_{22}^2 I_{22} \leq P_R. \quad (5)$$

The problem Is now to find the linear pre-coding matrix B that maximizes whichever utility function we desire, subject to the constraint of Equation (5). Notice that phase 1 determines the indicator variables $I_{ij}$, and thus alter the form of the linear pre-coding matrix B. We assume that the receiving mobile stations treat all undesired messages as noise. The rates achieved are then the Shannon rates with the appropriate receive SINRs:

$$\begin{bmatrix} Y_1 \\ Y_2 \end{bmatrix} = \begin{bmatrix} h_{11} & h_{21} \\ h_{12} & h_{22} \end{bmatrix} \begin{bmatrix} b_{11}I_{11} & b_{12}I_{21} \\ b_{21}I_{12} & b_{22}I_{22} \end{bmatrix} \begin{bmatrix} X_1 \\ X_2 \end{bmatrix} + \begin{bmatrix} N_1 \\ N_2 \end{bmatrix} \quad (6)$$

$$= \begin{bmatrix} (h_{11}b_{11}I_{11} + h_{21}b_{21}I_{12})X_1 + (h_{11}b_{12}I_{21} + h_{21}b_{22}I_{22})X_2 \\ (h_{12}b_{11}I_{11} + h_{22}b_{21}I_{12})X_1 + (h_{12}b_{12}I_{21} + h_{22}b_{22}I_{22})X_2 \end{bmatrix} + \begin{bmatrix} N_1 \\ N_2 \end{bmatrix}. \quad (7)$$

From this, the SNR $\gamma_1$ at MS 1, (for message $X_1$) and the SNR $\gamma_2$ at MS 2 (for message $X_2$) are given by:

$$\gamma_1 = \frac{(h_{11}b_{11}I_{11} + h_{21}b_{21}I_{12})^2}{(h_{11}b_{12}I_{21} + h_{21}b_{22}I_{22})^2 + N_1},$$

and $$\gamma_2 = \frac{(h_{12}b_{12}I_{21} + h_{22}b_{22}I_{22})^2}{(h_{12}b_{11}I_{11} + h_{22}b_{21}I_{12})^2 + N_2}.$$

For the second phase, the achievable Shannon rates $R^2_1$ to MS 1, and $R^2_2$ to MS 2, are then given by $$R^2_1 = \frac{1}{2}\log_2(1 + \gamma_1), \quad (8)$$

$$R^2_2 = \frac{1}{2}\log_2(1 + \gamma_2).$$

The utility functions to be optimized can be derived from the receive SNRs 1, 2 or from the achieved rates $R^2_1$ and $R^2_2$. We make a few remarks on optimizing the extreme fairness condition and the maximal throughput condition before describing the phase 2 transmission techniques of dirty-paper coding.

First, notice that the 2×2 matrix B can have one to four non-zero elements. When a certain relay station does not have a certain message, the corresponding element of the B matrix is zero. This results in a form of constrained, and possibly asymmetric linear pre-coding. One common choice of linear pre-coding matrix in the general case, where all messages are known to all transmitters (thus B may have all its entries be strictly positive) is the zero-forcing pre-coder. There, the matrix B is selected to be the inverse of the channel matrix H (or pseudo inverse, in the case of a non-square matrix H) such that the channel between the inputs and outputs appears diagonal. Power is then allocated so as to optimize the desired criterion.

When the criterion is to maximize throughput, allocating power according to the conventional water filling power allocation (allocating power water into parallel channels) is known to be optimal. One reference that describes water-filling is "Information Theory and Reliable Communication," by Robert G. Gallager, John Wiley and Sons, 1968, which is incorporated herein by reference. In the two cases that B has three non-zero elements rather than four, one can ask whether a similar zero-forcing and water filling solution exists. As the inverse of a channel matrix H, in general, requires a matrix of all non-zero elements. It may seem that it is impossible to do zero-forcing, or to create parallel channels in the asymmetrically cooperating case.

However, because we do have either a lower or upper triangular matrix B for pre-coding, it would seem plausible that at least a portion of the channel can be eliminated. That is, rather than pre-coding, to suppress the interference to both MS 1 and MS 2 as the zero-forcing solution does, the interference to one of MS 1 or MS 2 can be suppressed, while the other mobile continues to experience interference. This is possible in certain scenarios using a heuristic pre-coding matrix B, as we describe below. The fact that this is only possibly in certain scenarios also offers an important insight into when cooperation according to the invention is beneficial, First, let B=WP, where W is a pre-coding matrix with unit length rows and P is a diagonal matrix P=diag($\sqrt{P_1}$, $\sqrt{P_2}$), where $P_1+P_2=P_R$, according to the relay sum power constraint. The matrix W is of the same form, or has forced zeros, according to the message knowledge structure, as the matrix B. Thus, the matrix W is the pre-coding matrix, and P is the power allocation matrix. Now, the received signal is be given by $$Y = HX + N$$
$$= HBU + N$$
$$= HWPU + N.$$

Then, the conventional zero-forcing approach to this problem takes W=$H^{-1}$ (or the pseudo-inverse if this does not) so as to turn the system into a set of parallel channels, and then to water fill to obtain the power allocation P. In our case, we cannot take W=$H^{-1}$ because the matrix W is of a special form, dictated by the message knowledge structure.

In order to explore the asymmetric cooperation case, assume the matrix B is upper triangular in form. This means relay 1 has both messages, while relay 2 has only message 2. Our problem thus reduces to finding the "best" upper triangular linear pre-coding matrix. Linear algebra tells us that for a given matrix H, one can find a permutation matrix Π and lower L and upper V matrices such that

Π·H=L·V.

We can thus write H=$\Pi^{-1}$·L·V, and thus

Y=$\Pi^{-1}$LVWPU +N.

We can take W=$V^{-1}$. Notice that the matrix W is upper triangular, and that the inverse of an upper triangular matrix is again upper triangular. One can guarantee that W is upper triangular by permuting message indices. This choice of W turns the channel into the new one H'=$\Pi^{-1}$L, because Π is a permutation matrix, as is its inverse.

In the case of R relay stations and mobile stations, Π can represent any permutation of the indices {1, 2, ..., R}. In the two relay, two mobile example described here, Π can either be the identity permutation Π=(12), or may swap the indices 1 and 2, as Π=(21). Which one of these Π occurs depends entirely on the given channel matrix H. We consider the two possibilities, in general there will be R! cases:

1) Π=(12):

In this case, Π is the identity matrix, and the receive vector Y is given by $$\begin{bmatrix} Y_1 \\ Y_2 \end{bmatrix} = \begin{bmatrix} 1 & 0 \\ 0 & 1 \end{bmatrix} \begin{bmatrix} l_{11} & 0 \\ l_{21} & l_{22} \end{bmatrix} \begin{bmatrix} U_1 \\ U_2 \end{bmatrix} + \begin{bmatrix} N_1 \\ N_2 \end{bmatrix} \quad (9)$$

$$= \begin{bmatrix} l_{11} \sqrt{P_1}\, U_1 + N_1 \\ l_{21} \sqrt{P_1}\, U_1 + l_{22} \sqrt{P_2}\, U_2 + N_2 \end{bmatrix}. \quad (10)$$

Thus, the receiver $Y_1$ sees its desired signal interference free, while the receiver $Y_2$ still suffers interference from the undesired message $U_1$. In this case, intuitively, "half" of the channel was diagonalized, or forced to zero. This is possible because the channel matrix H has an LU decomposition with a unit Π matrix. Let us call a=$l_{11}$, b=$l_{21}$, and c=$l_{22}$. The achievable rates to the two mobile stations during the second phase are then given by $$R_1 = \frac{1}{2}\log_2\left(1 + \frac{|a|^2 P_1}{N_1}\right)$$

$$R_2 = \frac{1}{2}\log_2\left(1 + \frac{|c|^2 P_2}{|b|^2 P_1 + N_2}\right).$$

The optimization problem to solve for the powers $P_1$ and $P_2$ is then given by max max $R_1+R_2$ s.t. $P_1+P_2=P$ This can be solved using Lagrange multipliers. Denoting $$\mathcal{L} = R_1 + R_2 - \lambda(P_1 + P_2 - P) =$$
$$\frac{1}{2}\log_2\left(1 + \frac{a^2 P_1}{N_1}\right) + \frac{1}{2}\log_2\left(1 + \frac{c^2 P_2}{b^2 P_1 + N_2}\right) - \lambda(P_1 + P_2 - P)$$

Setting the partial derivative with respect to the three variables $P_1, P_2, \lambda$ to zero yields $$\frac{\partial P_1}{\partial \mathcal{L}} = \frac{a^2}{a^2 P_1 + N_1} - \frac{b^2 c^2 P_2}{\left(1 + \frac{c^2 P_2}{b^2 P_1 + N_2}\right)(b^2 P_1 + N_2)^2} - \lambda$$

$$\frac{\partial P_2}{\partial \mathcal{L}} = \frac{c^2}{1 + \frac{c^2 P_2}{b^2 P_1 + N_2}} - \lambda$$

$$\frac{\partial \lambda}{\partial \mathcal{L}} = P_1 + P_2 - P$$

Setting all these partial derivatives to zero allows us to write $P_2$ in terms of $P_1$ explicitly, and putting this into the equation P=$P_1+P_2$ enables us to solve for $P_1$ in terms of P, and the channel parameters a, b, c. We obtain a quadratic equation $P_1$, which can be solved explicitly. We set $$\frac{\partial P_1}{\partial \mathcal{L}} = \frac{\partial P_2}{\partial \mathcal{L}},$$

which falls out of the Lagrange conditions because we have the form $P_1+P_2=P$, and using $P_2=P-P_1$, yields the quadratic equation $$P_1^2(a^2b^2(b^2-c^2))+P_1(2a^2N_2(b^2-c^2))+(a^2N_2(N_2+c^2P)-c^2N_1(N_2+b^2P))=0 \quad (11)$$

This can easily be solved for $P_1$, from which $P_2=P-P_1$ can be obtained. If the quadratic equation does not produce a result in the range [0, P], then all the power is allocated to $P_2=P$, or all the power is allocated to $P_1=P$, whichever yields a larger sum-rate.

Thus, when $\Pi=(1)$, the above process produces a form of "half zero-forcing" solution with a modified water filling solution for the power.

2) $\Pi=(21)$:

In this case, $\Pi$ is the matrix with non-diagonal elements 1 and diagonal elements 0. In this case, the receive vector is given by $$\begin{bmatrix} Y_1 \\ Y_2 \end{bmatrix} = \begin{bmatrix} 0 & 1 \\ 1 & 0 \end{bmatrix}\begin{bmatrix} l_{11} & 0 \\ l_{21} & l_{22} \end{bmatrix}\begin{bmatrix} U_1 \\ U_2 \end{bmatrix} + \begin{bmatrix} N_1 \\ N_2 \end{bmatrix} \quad (12)$$

$$= \begin{bmatrix} l_{21}\sqrt{P_1}\,U_1 + l_{22}\sqrt{P_2}\,U_2 + N_1 \\ l_{11}\sqrt{P_1}\,U_1 + N_2 \end{bmatrix}. \quad (13)$$

We can thus see that because $\Pi$ is in a sense the "wrong" permutation, $Y_2$ receives a 'cleaned up' version of the undesired message $U_1$, rather than the desired messages $U_2$. The message knowledge structure which dictates the form of B (or equivalently W) is not compatible with the channel matrix gains in H, which dictate the permutation $\Pi$. In this case, it is not possible to partially diagonalize the matrix to the receivers.

Although one could think that properly permuting indices may relieve the situation, this is not the case, and the above problem forms the fundamental block towards partially diagonalizing any channel using only a triangular matrix.

The fact that we can only partially diagonalize the channel (only one of the receivers sees an interference free channel) demonstrates the intertwined nature of phase 1 and 2. Phase 1 determines the structure of B (or W), while the channel matrix H of phase 2 determines the permutation matrix $\Pi$. If these matrices are not aligned, then partial diagonalization is not possible, Notice also that in our example application, only one of the two permutations is 'bad'. However, in general, all but one of the permutations are bad, thus the probability of having phase 1 and 2 line up so as to allow for this simple form of diagonalization is 1 in R!, assuming all permutations are equally likely. If the channels do line up, one can proceed to determine the power allocations $P_1$, $P_2$ subject to $P_1+P_2=P_R$ that maximizes the objective function. Otherwise, another form of linear pre-coding is needed.

Linear pre-coding is well known, see Caire, "MIMO downlink joint processing and scheduling: a survey of classical and recent results," in Proceedings of the Information Theory and its Applications Workshop, February 2006, incorporated herein by reference. There, all linear pre-coding matrices are full matrices, unlike our matrices here with zeros depending on the message knowledge structure. Even in the case of full matrices, the selection of a linear preprocessing (or beam forming) matrix B in order to maximize the sum-rate, is not known. To quote Caire, page 2, "The weighted rate sum maximization under linear beamforming is a non-convex problem that has escaped so far to a simple solution."

Thus, the solution to even the full matrix case is non-trivial. When the problem becomes asymmetric, as it does here, intuitively it can only complicate things even further. Furthermore, the sum rate maximization problem can be posed under linear pre-coding constraints, see Equation (3), Stojnic et al., "Rate maximization in multi-antenna broadcast channels with linear preprocessing," IEEE Trans, Wireless Commun., vol. 5, no, 9, pp. 2338-2343, September 2006, incorporated herein by reference. They state that a closed-form analytic solution to Equation (3) is not easy to find.

In fact, even an efficient process that is guaranteed to numerically solve Equation (3) does not seem within reach. Therefore, we concentrate on the results of linear preprocessing, rather than on finding analytical or efficient algorithms for determining the results. In the two relay, two mobile scenario, a brute force search over possible linear pre-processing matrices is still numerically feasible using an asymmetric form of linear preprocessing. This asymmetry is a direct result of the ordering of the phase 1 base station to relay channel gains in combination with the broadcast advantage of the wireless medium.

Dirty-Paper Coding

The second transmission strategy for phase 2 we consider is dirty-paper coding. This encoding method has been shown to be capacity achieving for the Gaussian MIMO broadcast channel, see Weingarten et al. above. The capacity region is comprised of a union over transmit covariance matrices and dirty-paper coding orders (permutations of the transmitted messages) of the dirty-paper coding rates.

More precisely, in AWGN with K relay stations and K mobile stations (K messages therefore), the capacity region is achieved using a Gaussian codebook. If the relay stations and messages are fixed, as a result of phase 1, we can assume that relay 1 receives all messages $s_1, \ldots, s_K$, relay 2 receives messages $s_2, \ldots, s_K$, and relay i receives messages $s_i, \ldots, s_K$. We assume there are R relay stations transmitting K messages. This induces a strict pyramid-like message knowledge structure. Of course, it could be that all relay stations receive all messages (the other extreme), or any step-like case in between. All we require is that, if $S_i$ denotes the subset of messages relay i receives, then we have in general $S_1 \subset S_2 \subset, \ldots, S_i \subset S_R$.

We now describe the broadcast channel region, and how it must be modified to account for our particular additional message knowledge structure constraints. Recall that we have K messages. With each message j we associate a covariance matrix $B_j$ of size R×R, where R is the number of relay stations. This covariance matrix is used to generate the Gaussian codebook for the $j^{th}$ message, and describe how this message is correlated between the R relay antennas. Recall that each relay has a single antenna, and so the K relay stations may be thought of as a distributed antenna array.

In the MIMO broadcast channel, the covariance matrix $B_j$ can be any positive-semi-definite matrix, subject to some constraints such as for example power constraints, as all antennas are by definition of the MIMO broadcast channel able to transmit all messages. In our distributed MIMO broadcast channel however, this assumption breaks down. Not every relay receives all messages, and so some of the entries of $B_j$ must be put to zero (else some relay could encode a message it did not receive).

Specifically, we describe the covariance matrix $B_i$ for message $s_i$. If relay $R_j$ has the message $s_i$, then entry $(B_i)_{jj}$ can be non-zero. If it does not have the message, then we have $(B_i)_{jj}=0$. If relay stations $R_j$ and $R_k$ both have message $s_i$, then $(B_i)_{jk}$ may be non-zero. If either does not have the message, then $(B_i)_{jk}=(B_i)_{ij}=0$. The only constraint on $B_i$, in addition to the proper zeros, depending on the message knowledge, is that it is a proper covariance matrix (positive semi-definite, or $B_i \succeq 0$), and then the power constraint often seen in AWGN channels.

Specifically, if we have a total power constraint of P (rather than a per antenna power constraint), then we must have trace$(\Sigma_i B_i) \leq P$. Per-antenna constraints can be accounted for by saying $(\Sigma_i B_i)_j \leq P_j$ for the $j^{th}$ antenna power constraint of $P_j$.

The broadcast channel region is achieved through dirty-paper coding. This involves specifying a dirty-paper coding order. That is, the first message is encoded as if no other messages exist. Then, the second message is encoded treating the first as non-causally known interference ("dirty-paper coding" the message). This continues until the last message is encoded, where all the other already encoded messages are treated as non-causally known interference. Thus, one can ensure that the recipient of this message sees no interference from the other messages. Thus, the "order" in which the encoding is done matters, and will affect the interference seen by the different receivers.

In a conventional MIMO broadcast channel, all permutations are permitted, and the capacity region actually explicitly takes the union over all permutations, or encoding orders. In our case, not all permutations are permitted. That is, one cannot dirty paper code against a message that one does not have. That is, the message that is received by all stations is encoded first. Then, the message that is received by all-but-one stations is encoded using that first as non-causally known interference, and so on, until the message that is received only by a single relay is encoded, treating all the other messages as non-causally known interference.

The rates achieved if relay 1 has all messages, and relay K has only one message (and for ease of presentation we assume a strict ordering, or that each consecutive relay station knows one less message), and assume that message 1 is known by only one relay station, and so on until message K is known by all relay stations. Then, the permutation (or dirty-paper coding order) must be (K K−1, . . . , 2 1), and matrix $B_K$ is full, while matrix $B_1$ is all zeros save for $(B_1)_{11}$.

Let $H_i$ denote the channel between all relay stations and mobile i. It is a 1×K row vector. Let $N_i$ be the noise covariance matrix at mobile i. The rates achievable then are;

$$\mathcal{R}(B_1, B_2, \ldots, B_K) = \begin{cases} (R_1, R_2, \ldots, R_K): \\ R_K \leq \frac{1}{2}\log_2\left(\frac{\left|H_K\left(\sum_{i=1}^{K} B_i\right)H_K^T\right|}{\left|H_K\left(\sum_{i=2}^{K} B_i\right)H_K^T + N_K\right|}\right) \\ R_{K-1} \leq \frac{1}{2}\log_2\left(\frac{\left|H_{K-1}\left(\sum_{i=2}^{K} B_i\right)H_{K-1}^T\right|}{\left|H_{K-1}\left(\sum_{i=2}^{K} B_i\right)H_{K-1}^T + N_{K-1}\right|}\right) \\ \vdots \\ R_1 \leq \frac{1}{2}\log_2\left(\frac{|H_1 B_1 H_1^T|}{|N_1|}\right) \end{cases}$$

Our problem then reduces to solving for the $B_i$'s of the specific form (with zeros at the appropriate matrix elements), and the permutations of the right form, that maximize whatever utility function is desired.

Solving this optimization problem might be difficult in practice. We do not focus on finding efficient algorithms for determining the optimal B, instead, we focus on the results of a brute force optimization, which specifies which forms of cooperation are worthwhile.

As an example of dirty-paper coding under our asymmetric constraints, consider again the 2 relay, 2 mobile scenario. Suppose relay 1 has both message 1 and 2, while relay 2 only has message 2. Then, the only permissible permutation is (21). That is, first message 2 is encoded, then message 1 is encoded using message 2 as a priori known interference. The two transmit covariance matrices $B_1$, $B_2$ in this example are 2×2 matrices, and we recall that a transmit covariance matrix indicates how the message i is correlated across the 2 relay antennas. In the following, letters indicate possibly non-zero elements. We thus have $$B_1 = \begin{pmatrix} d & 0 \\ 0 & 0 \end{pmatrix},$$

$$B_2 = \begin{pmatrix} a & b \\ b & c \end{pmatrix}.$$

The achievable rates during the second phase are then given by, for $H_1$, $H_2$ the channels between the relay stations and MS 1 and 2 respectively, $$R_1 \leq \frac{1}{2}\log_2\left(\frac{|H_1(B_1)H_1^T + N_1|}{|N_1|}\right), \quad (14)$$

and $$R_2 \leq \frac{1}{2}\log_2\left(\frac{|H_2(B_1 + B_2)H_2^T|}{|H_2 B_1 H_2^T + N_2|}\right)$$

The constraint on the covariance matrices $B_1$ and $B_2$ are that they be positive definite. In our case $N_1$ and $N_2$ are the noise variances, which are scalars, and so the determinants are redundant. This particular 2 relay, 2 message scenario with asymmetric message knowledge is an example of a cognitive radio channel], or an interference channel with degraded message sets.

The capacity region of this channel is determined under per-antenna power constraints, in the weak interference regime ($h_{21} \leq 1$). These results are used in the next subsection in which the maximal sum throughput under dirty-paper coding is determined for phase 2.

Explicit Sum-Throughput for Phase 2 for DPC with Maximal Throughput

We can explicitly determine the maximal sum throughput of the four cases for dirty-paper coding during phase 2. This leads to the possibility of avoiding brute-force searches when trying to maximize the sum-rate for the DPC case, at least for the 2 transmitter, 2 receiver case.

Consider the four possible combinations of relay stations and messages that can be achieved without loss of generality. Assuming $|h_{BR1}| > |h_{BR2}|$. These are given by 1) Case 1: $I = \begin{bmatrix} 1 & 1 \\ 0 & 0 \end{bmatrix}$ 2) Case 2: $I = \begin{bmatrix} 1 & 1 \\ 1 & 0 \end{bmatrix}$ 3) Case 3: $I = \begin{bmatrix} 1 & 1 \\ 0 & 1 \end{bmatrix}$ 4) Case 4: $I = \begin{bmatrix} 1 & 1 \\ 1 & 1 \end{bmatrix}$.

We describe the analytical sum throughput in all four cases and derive it analytically.

Case 1:

$$I = \begin{bmatrix} 1 & 1 \\ 0 & 0 \end{bmatrix}$$

In the 2 relay; 2 mobile scenario with single antennas at all nodes, this becomes an information theoretic degraded Gaussian broadcast channel. Its capacity region is known, and can be expressed in terms of a single parameter $\alpha$.

The capacity region for the Gaussian broadcast channel with signal power constraint P, channel gains $h_{11}$ and $h_{12}$ to the two receivers with additive white Gaussian noise of zero means and variances $N_1$ and $N_2$, respectively is given $$R_1 \leq \frac{1}{2}\log_2\left(1 + \frac{|h_{11}|^2 \alpha P}{N_1}\right) \quad (15)$$

$$R_2 \leq \frac{1}{2}\log_2\left(1 + \frac{|h_{12}|^2(1-\alpha)P}{|h_{12}|^2 \alpha P + N_2}\right), \text{ for } 0 \leq \alpha \leq 1. \quad (16)$$

When maximizing the sum-rate, it is easy to see that this is achieved at either $\alpha=0$, when $|h_{12}|>|h_{11}|$, or $\alpha=1$, when $|h_{12}|<|h_{11}|$. One can take the derivative with respect to a and notice that, it is never zero, and thus achieves its maximum on the endpoints of the interval $\alpha \in [0, 1]$. Thus, as expected, when one wishes to maximize the sum-rate in a broadcast channel with single antennas, it is best to select and send to the receiver with the best channel.

2) Case 2:

$$I = \begin{bmatrix} 1 & 1 \\ 1 & 0 \end{bmatrix}$$

In this case we can use the result of Jovicic et al, to arrive at the maximal sum-rate. One important detail to note is that their results all assume per antenna power constraints, whereas we are assuming power may be allocated in any way the two relay stations. This must be taken into account when evaluating the regions. Also, their scenarios do not directly correspond to ours, and so we must be careful with the indices.

The capacity region of the case 2 scenario is derived by Jovicic et al., albeit in a different context, and depends on the relative channel parameters. In the case that $|h_{12}|>|h_{11}|$ Corollary 4.1 of Jovicic et al. states that the maximal sum-rate is given by $$R_{sum} = \frac{1}{2}\log_2(1 + (h_{11}\sqrt{P_1} + h_{21}\sqrt{P_2})^2).$$

This is under the per antenna power constraint of $P_1$ and $P_2$. In our case, the relay stations may distribute power in whatever manner they wish, as long as $P_1 + P_2 \leq P$. One can solve the optimization problem $$\max \frac{1}{2}\log_2(1 + (h_{11}\sqrt{P_1} + h_{21}\sqrt{P_2})^2) \quad (17)$$

$$s.t. \quad P_1 + P_2 \leq P \quad (18)$$

to obtain a quadratic equation for $P_1$, which yields two solutions $$P_1^{optimal} = \frac{P}{2}\left(1 \pm \frac{h_{21}^2 - h_{11}^2}{h_{21}^2 + h_{11}^2}\right)$$

from which it can be derived that the maximal sum-rate is obtained by the water-filling-like solution $$P_1 = \frac{P}{2}\frac{h_{11}^2}{h_{11}^2 + h_{21}^2},$$

and the maximal sum-rate is then given by $$R_{DPC} = \frac{1}{2}\log_2(1 + P(h_{11} + h_{21})^2).$$

On the other hand, when $|h_{12}|<|h_{11}|$, the capacity region of the considered channel, with this particular message knowledge structure is given by $$R_1 \leq \frac{1}{2}\log_2\left(1 + \frac{\left(h_{21}\sqrt{P_2} + h_{11}\sqrt{\alpha P_1}\right)^2}{1 + h_{21}^2(1-\alpha)P_1}\right) \quad (19)$$

$$R_2 \leq \frac{1}{2}\log_2(1 + (1-\alpha)h_{12}^2 P_1), \text{ for } 0 \leq \alpha \leq 1. \quad (20)$$

This is optimized with respect to $0 \leq \alpha \leq 1$ as well as $P_1 + P_2 \leq P$.

3) Case 3:

$$I = \begin{bmatrix} 1 & 1 \\ 0 & 1 \end{bmatrix}$$

In this case, we can use the result of Jovicic et al. to determine the maximal sum-rate. One important detail to note is that their results all assume per antenna power constraints, whereas we assume that power can be allocated in any way to the relay stations. This must be taken into account when evaluating the regions. Also, their scenarios do not directly correspond to ours, and so we must be careful with the indices. The capacity region of the case 3 scenario is derived by Jovicic et al., albeit in a different context, and depends on the relative channel parameters.

In the case that $|h_{12}| > |h_{22}|$, the maximal sum-rate is given by $$R_{sum} = \frac{1}{2}\log_2\left(1 + \left(h_{12}\sqrt{P_1} + h_{22}\sqrt{P_2}\right)^2\right)$$

This is under the per antenna power constraint of $P_1$ and $P_2$. In our case, the relay stations can distribute power in whatever manner they wish, as long as $P_1 + P_2 \leq P$. One can solve the optimization problem $$\max \frac{1}{2}\log_2\left(1 + \left(h_{12}\sqrt{P_1} + h_{22}\sqrt{P_2}\right)^2\right) \quad (21)$$

$$\text{s.t. } P_1 + P_2 \leq P \quad (22)$$

to obtain a quadratic equation for $P_1$, which yields the two solutions $$P_1^{optimal} = \frac{P}{2}\left(1 \pm \frac{h_{22}^2 - h_{12}^2}{h_{22}^2 + h_{12}^2}\right)$$

from, which it can be derived that the maximal sum-rate is obtained by the water-filling-like solution $$P_1 = \frac{P}{2}\frac{h_{12}^2}{h_{12}^2 + h_{22}^2},$$

and the maximal sum-rate is then given by $$R_{DPC} = \frac{1}{2}\log_2(1 + P(h_{12} + h_{22})^2).$$

When $|h_{12}| < |h_{22}|$, the capacity region of the considered channel, with this particular message knowledge structure is given by $$R_1 \leq \frac{1}{2}\log_2(1 + (1-\alpha)h_{11}^2 P_1) \quad (23)$$

$$R_2 \leq \frac{1}{2}\log_2\left(1 + \frac{\left(h_{22}\sqrt{P_2} + h_{12}\sqrt{\alpha P_1}\right)^2}{1 + h_{12}^2(1-\alpha)P_1}\right), \quad (24)$$

for
$0 \leq \alpha \leq 1$.

This is optimized with respect to $0 \leq \alpha \leq 1$ as well as $P_1 + P_2 \leq P$. For example, deriving the sum-rate $R_1 + R_2$ with, respect to $P_1$, and setting it to zero requires us to solve the following equation for $P_1$ in terms of $\alpha$:

$$0 = \frac{(1-\alpha)h_{11}^2}{1+(1-\alpha)h_{11}^2 P_1} + \frac{\begin{pmatrix} h_{22}\sqrt{P-P_1} + h_{12}\sqrt{\alpha P_1} \end{pmatrix}\begin{pmatrix} h_{12}\sqrt{\alpha(P-P_1)} - h_{22}\sqrt{P_1} + h_{12}^2 \\ h_{22}(1-\alpha)(-P\sqrt{P_1} - P + P_1) \end{pmatrix}}{\sqrt{P_1(P-P_1)}\,(1+h_{12}^2(1-\alpha)P_1)} \begin{pmatrix} 1 + h_{12}^2 P_1 + h_{22}^2(P-P_1) + \\ 2h_{12}h_{22}\sqrt{\alpha P(P-P_1)} \end{pmatrix}$$

Similarly, trying to first set the sum-rate derivative with respect to $\alpha$, assuming $P_1$ is fixed, to zero yields a quadratic in $\sqrt{\alpha}$, which is solved as $$(\sqrt{\alpha})^4\left[-h_{11}^2 h_{12}^3 h_{22} P_t^2 \sqrt{P_1(P-P_1)}\right] +$$
$$(\sqrt{\alpha})^3[0] + (\sqrt{\alpha})^2\left[3h_{11}^2 h_{12} h_{22} P_1 \sqrt{P_1(P-P_1)} + h_{12}^2 P_1(h_{12}h_{22}h_{11}^2 P_1\sqrt{P_1(P-P_1)} - 1 - h_{12}^2 P_1 - h_{22}^2(P-P_1))\right] +$$
$$(\sqrt{\alpha})\left[(1 + h_{12}^2 P_1 + h_{22}^2(P-P_1))(h_{11}^2 - h_{12}^2)P_1\right] -$$
$$(1 + h_{11}^2 P_1)(h_{12}h_{22}\sqrt{P_1(P-P_1)} + h_{12}^3 h_{22} P_1 \sqrt{P_1(P-P_1)}) = 0$$

4) Case 4:

$$I = \begin{bmatrix} 1 & 1 \\ 1 & 1 \end{bmatrix}$$

In this case, we have two mobile stations with a single antenna each, broadcast channel. The maximum achievable throughput of the two antenna, two single antenna receiver Gaussian broadcast channel, in which the channel is described by the complex matrix $$H = \begin{bmatrix} h_{11} & h_{21} \\ h_{12} & h_{22} \end{bmatrix},$$

which is known to both the transmitter and receiver, and is given by:

$$R_{DPC} = \begin{cases} \frac{1}{2}\log_2(1 + (|h_{11}|^2 + |h_{21}|^2)P), & P \le A_1 \\ \frac{1}{2}\log_2\left(\frac{(P_{\det}(HH^\dagger) + \text{trace}(HH^\dagger))^2 - 4|h_{12}h_{11}^\dagger + h_{22}h_{21}^\dagger|^2}{4\det(HH^\dagger)}\right), & P > A_1 \end{cases}$$

where without loss of generality it is assumed that $|h_{11}|^2 + |h_{21}|^2 > |h_{12}|^2 + |h_{22}|^2$, and where $$A_1 = \frac{|h_{11}|^2 + |h_{21}|^2 - |h_{12}|^2 - |h_{22}|^2}{\det(HH^\dagger)}.$$

Above, we describe the general joint optimization functions for phase 1 and phase 2. We also describe the structure of the phases and parameters to be optimized, rather than detailing particular optimization criterion. We now describe some of the particularities involved in the optimization, over two phases, of the two criteria we consider are extreme fairness and maximal throughput.

We perform the optimization for various random node distributions and channel parameters. We describe which of the message knowledge structures perform the best, and are selected in the final optimization.

At a low SNR, it is often best to use all the relay stations to transmit to a single mobile station. Also, one of the asymmetric message knowledge cases, where one relay station has both messages, the other relay station has only one message, often performs better, under the two considered optimization criteria, than having both relay stations know both, messages and employing conventional SDMA techniques. Thus, asymmetric forms of cooperation are often superior than their fully cooperative counterparts.

We consider the two phase optimization problem which seeks to determine the phase 1 message transmission times $t_1$, $t_2$, and possibly rates $R^{(1)}_1$, $R^{(1)}_2$, as well as the phase 2 encoding parameters, either the linear pre-coding matrix B, or the dirty paper covariance matrices of the two messages $B_1$, $B_2$ that optimize either the extreme fairness or the maximal throughput criterion.

One common method in solving these two cases uses an enumeration over all possible message knowledge structures. That is, because we are dealing with a two relay, two mobile system, it is possible to enumerate all relevant transmission knowledge structures, or which relay stations obtain which messages.

For each one of these possibilities we solve the two phase optimization problem to obtain the parameters needed in phase 2. Then, we select the phase 1 and phase 2 variables that optimize our criterion.

Extreme Fairness

Under the extreme fairness criterion, we minimize the total transmission time of one message, to each of the two mobile stations. Because we are seeking to explore the benefits of a cooperative system, we do not consider a two hop TDMA scheme, although this could be performed in the more general case. That is, phase 1 follows our TDMA structure to transmit the messages from the base station to the relay stations. However, during phase 2, both messages are transmitted concurrently by the two relay stations. Common to all the encoding methods and optimization criteria is the overall sum throughput over both phases defined as, $$\text{Overall throughput over 2 phases} = \frac{1}{t^{(1)}_1 + t^{(1)}_2 + t} \text{ (one message cases)} \quad (25)$$

$$= \frac{2}{t^{(1)}_1 + t^{(1)}_2 + t^{(2)}} \text{ (two message cases)} \quad (26)$$

where t denotes the time of phase 2, which is equal to $$t \triangleq \max(1/R_1^{(2)}, 1/R_2^{(2)}).$$

We use the following four message knowledge cases, which we refer to by their indicator matrices I. The four cases are shown in FIG. 6. The four cases, which we also refer to as message knowledge structure, are more explicitly defined, as;

1) $I = \begin{bmatrix} 1 & 1 \\ 0 & 0 \end{bmatrix}$: Relay 1 knows message 1 and 2, Relay 2 knows neither message 1 or 2

2) $I = \begin{bmatrix} 1 & 1 \\ 1 & 0 \end{bmatrix}$: Relay 1 knows message 1 and 2, Relay 2 knows message 1

3) $I = \begin{bmatrix} 1 & 1 \\ 0 & 1 \end{bmatrix}$: Relay 1 knows message 1 and 2, Relay 2 knows message 2

4) $I = \begin{bmatrix} 1 & 1 \\ 1 & 1 \end{bmatrix}$: Relay 1 knows message 1 and 2, Relay 2 knows message 1 and message 2

Extreme Fairness, Phase 1:

Because extreme fairness requires an equal number of bits be transmit to both relay stations, we assume $n_1 = n_2 = 1$. Then, the four possible phase 1 message knowledge structures and corresponding time pairs $(t_1, t_2)$ are:

1) $I = \begin{bmatrix} 1 & 1 \\ 0 & 0 \end{bmatrix}$: $t_1^{(1)} = \frac{1}{\log_2(1 + |h_{BR_1}|^2 P_B)}$, $t_2^{(1)} = \frac{1}{\log_2(1 + |h_{BR_1}|^2 P_B)}$ 2) $I = \begin{bmatrix} 1 & 1 \\ 1 & 0 \end{bmatrix}$: $t_1^{(1)} = \frac{1}{\log_2(1 + |h_{BR_2}|^2 P_B)}$, $t_2^{(1)} = \frac{1}{\log_2(1 + |h_{BR_1}|^2 P_B)}$ 3) $I = \begin{bmatrix} 1 & 1 \\ 0 & 1 \end{bmatrix}$: $t_1^{(1)} = \frac{1}{\log_2(1 + |h_{BR_1}|^2 P_B)}$, $t_2^{(1)} = \frac{1}{\log_2(1 + |h_{BR_2}|^2 P_B)}$ 4) $I = \begin{bmatrix} 1 & 1 \\ 1 & 1 \end{bmatrix}$: $t_i^{(1)} = \frac{1}{\log_2(1 + |h_{BR_2}|^2 P_B)}$, $t_2^{(1)} = \frac{1}{\log_2(1 + |h_{BR_2}|^2 P_B)}$ Extreme Fairness, Phase 2:

For each of these four cases, we have a different form of the phase 2 transmission scheme parameters. Fixing one of these cases, and calling $\beta_1$ the set of permissible phase 2 encoding parameters that phase 2 seeks to select the transmission parameters so as to minimize the phase 2 time, t. The phase 2 time t is given by $$t^{DPC} = \max(1/R_1^{DPC}, 1/R_2^{DPC}), \text{ for the DPC ease} \quad (27)$$

$$t^{lin} = \max(1/R_1^{lin}, 1/R_2^{lin}), \text{ for the linear precoding case} \quad (28)$$

For the second phase, the transmission rates $R^{DPC}_1$ and $R^{DPC}_2$ are given by Equation (14), and the rates $R^{lin}_1$, $R^{lin}_2$ are given by Equation (8), depending on which of the four cases we are dealing with, which determines the necessary zeros in the matrices $B_1$, $B_2$ or B respectively.

Thus, the optimization problems are given by $$\begin{aligned}\min\quad &\max(1/R_1^{DPC}, R_2^{DPC})\\ \text{s.t.}\quad & R_1^{DPC} = \frac{1}{2}\log_2\left(\frac{|H_1(B_1)H_1^T + N_1|}{|N_1|}\right)\\ & R_2^{DPC} = \frac{1}{2}\log_2\left(\frac{|H_2(B_1 + B_2)H_2^T|}{|H_2 B_1 H_2^T + N_2|}\right)\\ & B_1, B_2 \preceq 0, \quad \text{trace}(B_1 + B_2) \le P_R \\ & B_1, B_2 \in B_i \end{aligned}\right\} \text{DPC in phase 2}$$

and $$\begin{aligned}\min\quad &\max(1/R_1^{lin}, 1/R_2^{lin})\\ \text{s.t.}\quad & R_1^{lin} = \frac{1}{2}\log_2\left(1 + \frac{|h_{11}b_{11}I_{11} + h_{21}b_{21}I_{12}|^2}{|h_{11}b_{12}I_{21} + h_{21}b_{22}I_{22}|^2 + N_1}\right)\\ & R_2^{lin} = \frac{1}{2}\log_2\left(1 + \frac{|h_{12}b_{12}I_{21} + h_{22}b_{22}I_{22}|^2}{|h_{12}b_{11}I_{11} + h_{22}b_{21}I_{12}|^2 + N_2}\right)\\ & |b_{11}|^2 + |b_{12}|^2 + |b_{21}|^2 + |b_{22}|^2 \le P_R \\ & B \in B_i \end{aligned}\right\} \text{linear in phase 2}$$

Extreme Fairness, Overall:

The overall scheme selected is the one which minimizes $t_1 + t_2 + t^*$, where $t^*$ is the optimal value of the optimization problems in phase 2.

Maximal Throughput Criterion:

In contrast to the extreme fairness criterion, under the maximal throughput criterion, during each scheduling interval, each mobile may receive a different number of bits. For example, one mobile could even receive no bits at all. Whereas under the extreme fairness criterion, because of the predetermined number of bits to each user, only four pairs of phase 1 times $(t_1, t_2)$ are possible. Under the maximal throughput criterion, any number of bits is possible, implying any number of phase 1 time pairs for each possible message knowledge structure.

The joint optimization of the maximal throughput criterion over both phases is a complex, mixed integer programming problem (assuming the number of bits or packets are integer valued), which is furthermore non-convex under the linear pre-coding constraint. Thus, obtaining an analytical solution seems feasible, and interior point methods cannot be applied (non-convex).

Thus, we use a grid search to solve for the maximal throughput over both phases. The search Is made easier by being able to solve for the optimal number of bits $n_1$, $n_2$ for each possible rate pair $(R^{(2)}_1, R^{(2)}_2)$ during phase 2. For each, of the four cases, we cycle over all possible rate pairs $(R^{(2)}_1, R^{(2)}_2)$ that are possible during phase 2, for either the linear pre-coding or dirty paper coding transmission schemes.

This is done by cycling through all feasible linear pre-coding matrices or dirty paper coding covariance matrices respectively. In order to determine the overall throughput of this two-phase system, we obtain the times spent broadcasting messages 1 and 2, $t_1$, $t_2$ during phase 1, which depend on the number of bits transmitted as $t_1 n_1 R^{(1)}_1$, $t_2 = n_2 R^{(1)}_2$. The rates during phase 1 depend on which relay is the desired receiver, and corresponds to the Shannon rate of the relay with the worst channel which needs that particular message.

Thus, we find $n_1$, $n_2$ as the solutions to the overall max throughput optimization which we relax to be real numbers rather than integers. The loss can be made arbitrarily small by allowing large integers, $$\max\quad \gamma = \frac{a_1 n_1 + a_2 n_2}{b_1 n_1 + b_2 n_2 + \max(c_1 n_1, c_2 n_2)}$$
$$\text{s.t.}\quad n_1, n_2 \ge 0$$

where $a_1$, $a_2$ represent the 'importance' of getting bits to each mobile, and can in a sense, represent a quality of service, and in our case $$b_1 = \frac{1}{R_1^{(1)}}, \quad b_2 = \frac{1}{R_2^{(1)}}$$
$$c_1 = \frac{1}{R_1^{(2)}}, \quad c_2 = \frac{1}{R_2^{(2)}}.$$

One case shows that there are only three possible solutions to this optimization problem:

$$n_1 = 0, n_2 = 1 \quad \Rightarrow \gamma = \frac{a_2}{b_2 + c_2}$$
$$n_1 = 1, n_2 = 0 \quad \Rightarrow \gamma = \frac{a_1}{b_1 + c_1}$$
$$n_1 c_1 = n_2 c_2 \quad \Rightarrow \gamma = \frac{a_1 c_2 + a_2 c_1}{b_1 c_2 + b_2 c_1 + c_1 c_2}.$$

One can make a simple comparison and determine which $(n_1, n_2)$ pairs is optimal, for each of the possible message knowledge structures, and for each given phase 2 rate pair $(R^{(2)}_1, R^{(2)}_2)$, and select the one with the largest sum-throughput. Under the max throughput scenario, it is possible that either $n_1$ or $n_2$ is zero. Thus, single message cases are possible. Similar computations are possible for the linear pre-coding case.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for communicating in a wireless network using cooperative relaying, comprising:
    broadcasting, during a first phase of a scheduling interval, a set of messages from a base station to a set of relay stations;
    broadcasting cooperatively, during a second phase of the scheduling interval, the set of messages from the set of relay stations to a set of mobile stations; and
    optimizing jointly a time and a rate and a size of each message during the first phase, and a rate of each message during the second phase while broadcasting during the first phase and while broadcasting during the second phase, wherein the optimization is according to a utility function, and wherein each message includes a predetermined number of bits, and which the utility function uses an extreme fairness criterion where each mobile station receives an equal number of bits in a minimal amount of time.

2. The method of claim 1, in which the optimizing is according to a maximal throughput criterion under a power constraint for the relay stations.

3. The method of claim 1, in which the optimizing is according to a maximal throughput criterion under a minimal delay constraint.

4. The method of claim 1, in which the broadcasting during the first phase and the second phase uses a coding technique selected from the group comprising TDMA, SDMA, FDMA, CDMA, or OFDM.

5. The method of claim 1, in which a particular relay station receives a subset of the set of messages.

6. The method of claim 1, in which the second phase uses linear pre-coding.

7. The method of claim 1, in which the second phase uses dirty-paper coding.

8. The method of claim 1, in which a particular relay station broadcasts a particular message to another relay station.

9. The method of claim 1, in which the broadcasting during the first phase and the second phase uses time division multiple access.

10. The method of claim 1, in which each message includes the predetermined number of bits, and in which the utility function uses a maximal throughput criterion the mobile station receives a different number of bits using a minimal amount of power.

11. The method of claim 1, further comprising:
arranging channel gain between the set of relay stations and the set of mobile stations in a best-to-worst order in a message knowledge structure for the optimizing where links between the relay stations and the mobile stations indicate which relay stations receive which messages.

12. A system for communicating in a wireless network using cooperative relaying, comprising:
a base station configured to broadcast during a first phase of a scheduling interval a set of messages;
a set of relay stations configured to receive the set of messages and to broadcast cooperatively during a second phase of the scheduling interval the set of messages from the set of relay stations to a set of mobile stations; and
means for optimizing jointly a time and a rate and a size of each message during the first phase, and a rate of each message during the second phase while broadcasting during the first phase and while broadcasting during the second phase, wherein the optimization is according to a utility function, and wherein each message includes a predetermined number of bits, and which the utility function uses an extreme fairness criterion where each mobile station receives an equal number of bits in a minimal amount of time.

* * * * *